Patented July 26, 1949

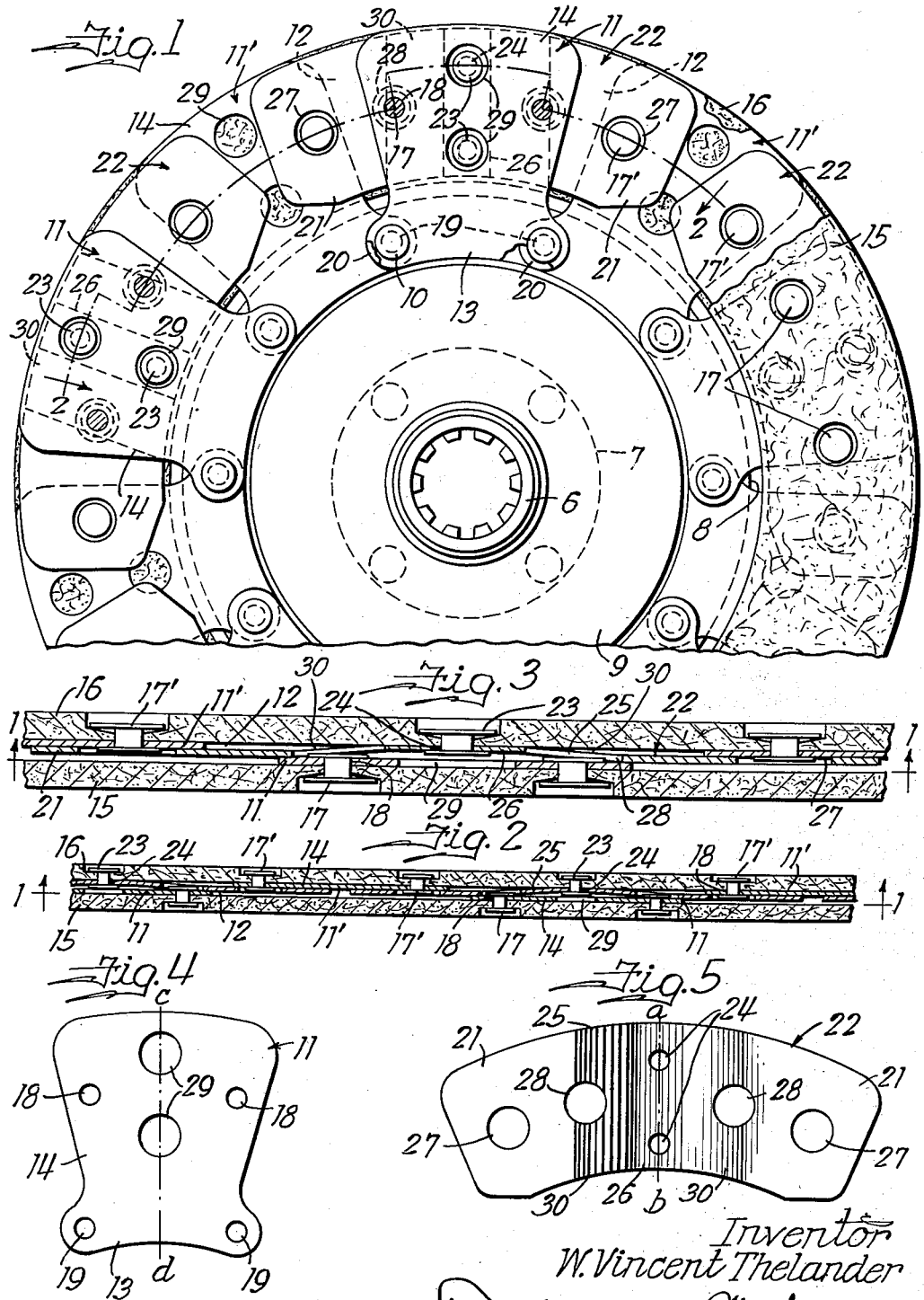

2,477,017

UNITED STATES PATENT OFFICE 2,477,017

FRICTION CLUTCH PLATE

W. Vincent Thelander, Auburn, Ind., assignor to Dava Corporation, Toledo, Ohio, a corporation of Virginia Application March 7, 1947, Serial No. 733,139

8 Claims. (Cl. 192—107)

This invention relates to clutches generally and is more particularly concerned with improvements in automotive type friction clutches.

One of the principal objects of my invention consists in the provision of a clutch plate of sectional construction utilizing a number of small sheet metal stampings to build up the outer annular portion on which the annular facings are mounted, it being possible to produce these stampings with much less waste than is involved in the stamping of large disks, and it being also possible to produce these stampings from salvaged scrap material, so that the present structure is made available at a much lower cost than would otherwise be possible. The present clutch plate has been so designed that all of the sheet metal stampings carrying the annular facings are of identical form, thus further reducing the cost of manufacture and simplifying as well as speeding up assembling.

An important object of the present invention is to provide a clutch plate embodying an improved "mush" construction between the friction facings, a salient feature of which lies in the provision of elongated substantially flat leaf springs bowed only in the middle portion where they are attached directly to the inner side of one of the two friction facing rings, each between two of the aforesaid stamped sheet metal segments that are fastened to the same friction facing ring for support thereof, with the flat opposed end portions of the leaf spring overlapping adjacent portions of said segments, each leaf spring being arranged to be flexed between its end portions by another segment that is fastened to the inner side of the other friction facing ring and disposed in abutment with the leaf spring on the opposite side from and intermediate the first mentioned segments. The use of the substantially flat leaf springs as compared with the conventional struck out ears commonly provided as integral portions of clutch plates results in an appreciable saving in cost of manufacture by reason of the fact that it enables use of lower cost sheet metal stampings for the plate segments instead of higher cost spring steel. The fact that the leaf springs can be riveted directly on one of the friction facing rings along with one set of segments instead of having to be fastened first to one set of segments results in simplified assembling and a big saving in cost of production, and the final product is also far better. Furthermore, with the present construction there is no difficulty in obtaining clutch plates in quantity production of uniform thickness in the facing portion and with the facings in substantial parallelism throughout the circumference, whereas with the other earlier constructions mentioned, such uniformity in thickness and parallelism of facings was not obtained, and as a result such plates when installed would not give as good performance nor would they last as long as could otherwise be expected.

The invention is illustrated in the accompanying drawing, in which

Fig. 1 is a rear view of a clutch plate made in accordance with my invention, the lower portion being broken away to conserve space and a portion of one friction facing ring being removed to better illustrate the mush construction, the latter being viewed on the line I—I of Figs. 2 and 3;

Fig. 2 is a sectional detail on the broken arcuate line 2—2 of Fig. 1;

Fig. 3 is an enlargement of a portion of Fig. 2 to better illustrate the construction, and Figs. 4 and 5 are detached views of one of the stamped sheet metal segments, and one of the substantially flat leaf springs, respectively.

The same reference numerals are applied to corresponding parts throughout the views.

The clutch plate shown comprises relatively rotatable inner and outer portions, the inner portion being formed by a center hub 6 splined for driving connection with the driving shaft of an automotive transmission, and provided with an annular flange 7 onto which notched plates are riveted for oscillatory movement with the hub relative to a ring 8 that is notched in register with the notching of the aforesaid plates for cooperation with hydraulic piston and cylinder assemblies inside the housing 9, as disclosed, for example, in my Patent 2,337,135, issued December 21, 1943, the housing 9 having its opposite side plate riveted to the ring 7, as indicated at 10, and containing a heavy lubricating oil or grease as the working fluid for the piston and cylinder assemblies. Springs are also provided as a part of these piston and cylinder assemblies, as disclosed in the patent just mentioned, and in operation when relative movement takes place between the hub 6 and ring 8, that is to say between the inner and outer portions of the clutch plate, the springs of said assemblies are compressed to cushion the drive, and at the same time the heavy oil or grease with which the cylinders of said assemblies are filled is discharged to some extent through bleeder holes in the cylinders, so that a pumping action is obtained adding materially to the cushioning effect and accordingly relieving the cushioning springs of some of the load. The recoil action of the springs is also checked by this pumping action, because their return to normal extended condition is retarded as a result of the restriction of the bleeder holes through which the heavy oil or grease must flow. In that way the secondary vibrations are absorbed and a smooth drive is obtained.

The outer portion of the plate contains the mush construction with which my invention is particularly concerned. There are two series of stamped sheet metal segments 11 and 11', the circumferentially spaced segments 11 of one series being in staggered relation to the circumferentially spaced segments 11' of the other series, and the spaces between the segments of each series being wider than the segments, as is clearly indicated by the spaces 12 in Fig. 1, so that the segments, which are secured to the housing 9 by the rivets 10 entered through registering holes in the overlapping ends of the attaching portions 13 of the segments, are received in these spaces when the plate is compacted upon engagement of the clutch. That is to say, the segments 11 and 11' in the compacting of the outer portion of the plate will have their outer portions 14 brought more or less into coplanar relationship under pressure between the oposing drive faces of the flywheel and pressure plate in the engagement of the clutch. The friction facing rings or pads 15 and 16 are applied to the outer face of the segments 11 and 11' by rivets 17 and 17', respectively, the facing ring 15 being arranged for engagement by the pressure plate and the facing ring 16 for engagement with the flywheel. The segments 11 and 11', as clearly appears in Figs. 1 and 4 are segmental shaped and each has two holes 18 near the lateral edges to receive the rivets 17 or 17', as the case may be, for fastening the friction facing rings 15 and 16, the rivets 10 for fastening the segments being entered through another pair of holes 19 provided in the opposite ends of the attaching portion 13. The segments have the desired yield or flexibility to permit compacting the outer portion of the blade as herein contemplated. Washers 20 are preferably interposed between the attaching portions 13 of the segments 11 and 11', one at each rivet 10, so as to space the outer portions 14 in parallel planes and thus leave room between the two planes of the segments for the end portions 21 of the substantially flat leaf springs 22, which are of approximately the same thickness as the washers 20, or less. There is one of these leaf springs riveted to the friction facing ring 16 in each of the spaces between the segments 11', two rivets 23 being entered through two holes 24 provided on the radial centerline a—b of each leaf spring to fasten the same directly to the friction facing ring 16. Each of these leaf springs is of elongated form having its radially inner and outer longitudinal edges on arcs nearly coincident with and concentric with the inner and outer edges of the friction facing ring 16, and is substantially flat with the exception that the middle portion 25 is bowed to offset the narrow radially extending flat attaching portion 26 slightly relative to the coplanar flat end portions 21 and in parallel relation thereto. The offset is equivalent to the thickness of the segments 11' so as to permit riveting the attaching portion 26 of each leaf spring 22 directly to the inner side of the friction facing ring 16 and have the end portions 21 overlap portions of the adjacent segments 11' and lie normally in parallel relation thereto. The holes 27 in the end portions 21 register with the heads of rivets 17' on segments 11' and provide operating clearance with respect thereto. Other holes 28 spaced inwardly from the holes 27 but on the same radius cooperate similarly with the heads of rivets 17 on segments 11. The segments 11 all have two holes 29 provided therein on the radial centerline c—d registering with the heads of rivets 23 and affording operating clearance with respect thereto. Of course, the other segments 11' are shown similarly perforated but that is only because it was desirable to have all of the segments alike and interchangeable to facilitate manufacture and assembly. There is, therefore, no interference with the "packing" tightly together of the parts in the engagement of the clutch.

In operation, it should be clear that when the pressure plate is moved toward the flywheel in the engagement of the clutch, the facings 15 and 16 are pressed together, thereby flexing the segments 11 and 11' toward coplanar relationship and correspondingly flexing all of the leaf springs 22 which normally tend to resist the compacting of the outer portion of the plate, thus insuring the desired smooth engagement of the clutch and avoiding grabbing. The nearly flat V formed by the inclined portions 30 of the bowed intermediate portion 25 of each leaf spring is flattened still further by pressure of the adjoining segments 11 against the outer ends of these inclined portions, as will be best understood by reference to Fig. 3, and, of course, these leaf springs exert increasing spring pressure on the facings 15 and 16 as they approach fully engaged relationship, because as the V formed by the inclined portions 30 becomes more and more flattened, there is also an increased flexing of the end portions 21 as the segments 11 are crowded more and more closely toward coplanar relationship with the segments 11'. When the clutch is disengaged the leaf springs 22 automatically return to the unflexed form illustrated in Figs. 2 and 3, and the segments 11 and 11' are accordingly returned to their normal spaced parallel relationship. The leaf springs 22, being substantially flat, as distinguished from the spring metal parts of complicated form previously provided for mush purposes, make for a clutch plate of uniformly increased thickness in the disengaged condition, and therefore obviate an objection common in many other clutch plate constructions of non-uniform engagement and non-uniform and rapid wear of the clutch plate facings and a tendency for the clutch to grab. In other words, the substantially flat leaf springs 22 can be produced to the desired uniformity, whereas spring metal parts of complicated form cannot be produced to desired uniformity without a lot of difficulty, necessitating closer inspection and a high percentage of rejections in quantity production of clutch plates. The fact that the leaf springs 22 are riveted, as at 23, on one of the friction facing rings (16) along with the one set of segments 11' instead of having to be fastened first, as by welding, to one set of segments results in easier and quicker assembling and a proportionate saving in the cost of production, and the final product is also far better. Then too, the fact that the segments 11 and 11' are of identical form and are therefore interchangeable, results in an appreciable saving in the cost of production and simplifies and expedites assembling. Also, the fact the present mush construction requires the more expensive spring steel only in the leaf springs 22 is, of course, an important factor from the economy standpoint.

It is believed the foregoing description conveys a good understanding of the objects and advantages of my invention. The appended claims have been drawn to cover all legitimate modifications and adaptations.

I claim:

1. In a friction clutch driven plate, a mounting hub portion of relatively heavy sheet metal, and a peripheral portion comprising two parallel series of structurally independent plate sections of substantially equal width of readily distortable, thin, resilient sheet metal concentrically arranged relative to the axis of said hub and mounted in slightly axially spaced relation to one another on the hub to turn therewith and projecting radially therefrom, the plate sections of both series being circumferentially spaced and the plate sections of one series being in staggered relation to the plate sections of the other series and arranged to fit freely in the spaces between the plate sections of said other series whereby the two series of plate sections are adapted to be compacted into substantially coplanar relationship, two rings of friction facing material, one of which is mounted on the outer side of one series of said plate sections, and the other of which is mounted on the outer side of the other series of plate sections, and leaf springs each substantially equivalent in width to two of the plate sections fastened on the inner side of one of said friction facing rings independently of said plate sections having end portions in overlapping relation to adjacent plate sections of the series on the same friction facing ring and having intermediate portions in abutment with adjacent plate sections of the other series to resist compacting of the two series of plate sections.

2. In a device of the character described, a hub, two parallel series of plate sections concentrically arranged relative to the axis of said hub and mounted on the hub to turn therewith, the plate sections of both series being of substantially equal width and circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, two rings of friction facing material, one of which is mounted on the outer side of one series of said plate sections, and the other of which is mounted on the outer side of the other series of plate sections, and leaf springs each substantially equivalent in width to two of the plate sections and each fastened at its mid-portion on the inner side of one of said friction facing rings independently of said plate sections having end portions in overlapping relation to adjacent plate sections of the series on the same friction facing ring and having intermediate portions in abutment with adjacent plate sections of the other series to resist compacting of the two series of plate sections, said springs each being bent axially in one direction along spaced substantially parallel lines at the mid-portion and being bent axially in the other direction along two other more widely spaced substantially parallel lines, so as to offset the end portions in axially spaced substantially parallel relation to the middle portion and so that the inner ends of the offset end portions have abutment with the opposed edge portions of the adjacent plate sections of the other series.

3. In a device of the character described, a hub, two parallel series of plate sections concentrically arranged relative to the axis of said hub and mounted on the hub to turn therewith, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, rings of friction facing material abutting the outer faces of said plate sections, rivets extending through each of said rings and the plates of the associated series to fasten the rings to said plates, said rivets having heads on the inner ends thereof projecting only slightly from the inner faces of said plate sections, and leaf springs fastened on the inner side of one of said friction facing rings having end portions in overlapping relation to adjacent plate sections of the series on the same friction facing ring and abutting the same alongside the rivet heads, said leaf springs being thick enough in relation to the thickness of the rivet heads so as not to interfere with close compacting of the plate sections.

4. A device as set forth in claim 3, wherein the leaf springs have openings provided therein in register with the rivets which are large in diameter in relation to the diameter of the rivets.

5. In a device of the character described, a hub, two parallel series of plate sections concentrically arranged relative to the axis of said hub and mounted on the hub to turn therewith, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, rings of friction facing material abutting the outer faces of said plate sections, rivets extending through each of said rings and the plates of the associated series to fasten the rings to said plates, said rivets having heads on the inner ends thereof projecting only slightly from the inner faces of said plate sections, leaf springs abutting the inner side of one of said friction facing rings having end portions in overlapping relation to adjacent plate sections of the series on the same friction facing ring and abutting the same alongside the rivet heads, said leaf springs being thick enough in relation to the thickness of the rivet heads so as not to interfere with close compacting of the plate sections, and other rivets extending through said last mentioned ring and the leaf springs to fasten the leaf springs thereto, said rivets having heads on the inner ends thereof projecting only slightly from the inner side of said leaf springs, the plate sections fastened on the other ring having openings provided therein in register with the last named rivets which are large in diameter in relation to the diameter of said rivets, said plate sections being thick enough in relation to the thickness of the rivet heads so as not to interfere with close compacting of the plate sections.

6. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted in slightly axially spaced relation to one another on the hub to turn therewith and projecting radially therefrom, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, rings of friction facing material fastened to the outer faces of said plate sections, and spring means fastened to one of said rings between plate sections of one series and abutting the inner faces of plate sections of the other series to resist compacting of the plate sections.

7. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted in slightly axially spaced relation to one another on the hub to turn therewith and projecting radially therefrom, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, two rings of friction facing material, one of which is mounted on the outer side of one series of said plate sections, and the other of which is mounted on the outer side of the other series of plate sections, and spring means fastened on the inner side of at least one of said friction facing rings independently of said plate sections, but having abutment therewith to resist compacting of the plate sections in the engagement of the clutch.

8. In a friction clutch plate, a hub, two parallel series of plate sections concentrically arranged relative to the axis of said hub and mounted on the hub to turn therewith, the plate sections of both series being circumferentially spaced, and the plate sections of one series being in staggered relation to the plate sections of the other series and arranged to fit freely in the spaces between the plate sections of said other series, whereby the two series of plate sections are adapted to be compacted into substantially coplanar relationship, two rings of friction facing material fastened to the outer surfaces of said plate sections, and leaf springs fastened on the inner side of at least one of said rings independently of and in spaces between said plate sections and extending in a circumferential direction for overlapping at their extremities with adjacent plate sections of the series on the same friction facing ring to which the leaf springs are attached, and having abutment in inwardly spaced relation to said extremities with adjacent plate sections of the other series to resist compacting of the two series of plate sections.

W. VINCENT THELANDER.

REFERENCES CITED

The following references are of record in the file of this patent:

UNITED STATES PATENTS

| Number | Name | Date |
| --- | --- | --- |
| 2,316,820 | Thelander | Apr. 20, 1943 |
| 2,380,835 | Goodwin | July 31, 1945 |

Certificate of Correction

Patent No. 2,477,017                                                          July 26, 1949

W. VINCENT THELANDER

It is hereby certified that the name of the assignee in the above numbered patent was erroneously described and specified as "Dava Corporation" whereas said name should have been described and specified as *Dana Corporation*, as shown by the record of assignments in this Office; and that the said Letters Patent should be read with this correction therein that the same may conform to the record of the case in the Patent Office.

Signed and sealed this 20th day of December, A. D. 1949.

[SEAL]

THOMAS F. MURPHY,
*Assistant Commissioner of Patents.*